March 8, 1966 J. C. STEINBERG 3,238,910
SIGNAL CONTROLLED STEERING SYSTEM
Filed June 22, 1943 2 Sheets-Sheet 2

INVENTOR
J.C. STEINBERG
BY
Walter E. Kiesel
ATTORNEY

March 8, 1966      J. C. STEINBERG      3,238,910

SIGNAL CONTROLLED STEERING SYSTEM

Filed June 22, 1943      2 Sheets-Sheet 1

INVENTOR
J. C. STEINBERG
BY
Walter C. Kiesel
ATTORNEY

United States Patent Office 3,238,910
Patented Mar. 8, 1966

3,238,910
SIGNAL CONTROLLED STEERING SYSTEM
John C. Steinberg, Short Hills, N.J., assignor to Bell Telephone Laboratories, Incorporated, New York, N.Y., a corporation of New York
Filed June 22, 1943, Ser. No. 491,797
14 Claims. (Cl. 114—23)

This invention relates to signal controlled steering systems for moving bodies and more particularly to systems for steering a torpedo toward an object, such as a submarine, in accordance with information derived from signals emanating from the object.

One general object of this invention is to improve signal controlled steering systems for moving bodies and particularly such systems for steering a torpedo toward a submarine in response to compressional wave signals originating at or emanating from the submarine.

More specifically, objects of this invention are to:

Increase the sensitivity of sonically controlled steering systems for moving bodies;

Obtain resolution of sonic signals emanating from a submarine into accurate information as to the location of the submarine with respect to a torpedo, in accordance with which information the torpedo is steered toward the submarine;

Increase the range of effectiveness of a sonically steered torpedo;

Prevent false vertical steering of a sonically steered torpedo due to reflections of signals at the sea surface; and Simplify steering control systems for signal guided bodies.

In one illustrative embodiment of this invention, a torpedo comprises a vertical rudder, a horizontal rudder or elevator, two pairs of hydrophones, and control circuits for causing deflection of each of the rudders in accordance with information derived from the signals received by a corresponding pair of hydrophones.

In accordance with one feature of this invention, the hydrophones are non-directional in themselves and the hydrophones of each pair are mounted in alignment and are positioned on diametrically opposite sides of the torpedo body, the hydrophones being especially sensitive to signals of a predetermined frequency and spaced a distance large in comparison to the wave-length of this frequency in sea water. The torpedo body constitutes a barrier between the two hydrophones, the barrier effect being dependent upon the diffraction pattern of the body, so that the relative intensities of the signals received by the two hydrophones of each pair are dependent upon the angular location of the signal source with respect to the torpedo.

In accordance with another feature of this invention, the compressional signals received by the hydrophones of each pair are combined differentially and resolved into a direct current control signal related in amplitude and polarity to the difference of the compressional wave signals, and the respective rudder is deflected in accordance with the amplitude and polarity of the control signal.

In accordance with a further feature of this invention, means are provided in the elevator control system for compensating for the effects of signal reflections from the sea surface.

The invention and the above-noted and other features thereof will be understood more clearly and fully from the following detailed description with reference to the accompanying drawing in which.

Figure 1:
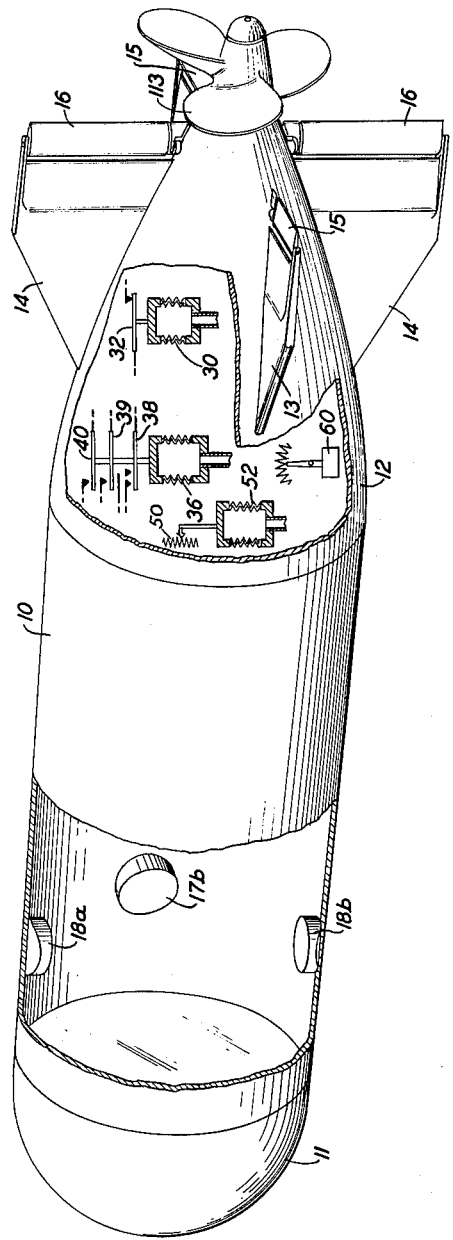
FIG. 1 is a perspective view of a torpedo including a steering system illustrative of one embodiment of this invention a portion of the torpedo being broken away to illustrate certain parts of the system.

Referring now to the drawing, the torpedo illustrated in FIG. 1 comprises a cylindrical body 10, for example of steel, a nose 11 in which an explosive charge is carried, and a tail section 12 from which the propeller 13 extends, the propeller being driven by a suitable motor, not shown, mounted within the torpedo. Mounted on the tail section 12 are horizontal and vertical fins 13 and 14, respectively, and horizontal and vertical rudders 15 and 16, respectively, each of the rudders being composed of two similar parts mechanically coupled to deflect in unison.

Figure 2:
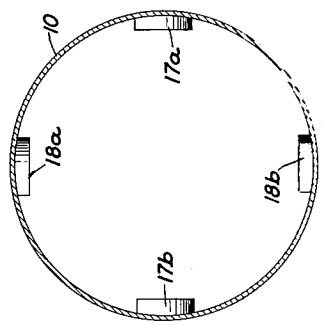
FIG. 2 is a cross-sectional view along plane 2—2 of FIG. 1 showing the location of the hydrophones.
Figure 3:
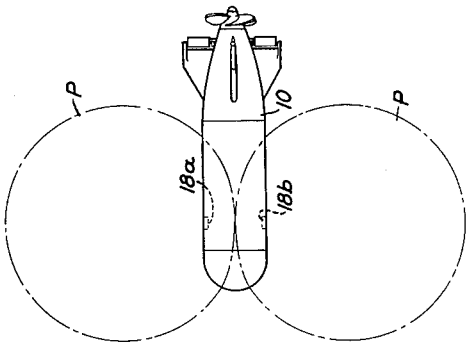
FIG. 3 is a diagrammatic top view of the torpedo illustrated in FIG. 1 showing the location of the horizontal hydrophones and the pick-up pattern thereof.

Mounted on the body 10, for example somewhat forward of the median plane thereof, are two pairs of hydrophones 17a and 17b and 18a and 18b, the two hydrophones of each pair being aligned along a diameter of the body as shown in FIG. 2, having substantially identical translating characteristics and being substantially non-directional. The space pick-up pattern of two of the hydrophones is indicated by the broken lines P in FIG. 3, from which it will be seen that, in position, the hydrophones are substantially non-directional about the axis of alignment thereof. Advantageously, the hydrophones are constructed to be especially sensitive at a particular supersonic frequency, for example of the order of 24 kilocycles per second, the wave-length at the frequency being small in comparison to the spacing between the hydrophones of each pair, i.e., the diameter of the cylindrical body 10.

Figure 4:
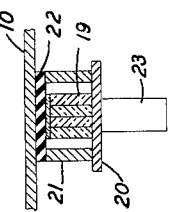
FIG. 4 is a view, partly in section, illustrating a hydrophone construction suitable for utilization in a control system in accordance with this invention.

A hydrophone construction found to be especially advantageous is illustrated in FIG. 4 and comprises a multislab piezoelectric crystal 19 insulatingly joined to a supporting plate 20 and mounted in a housing 21 including an end portion 22 having substantially the same transmission characteristics for supersonic compression waves as sea water, the housing being filled with castor oil or similar fluid. The crystal 19 is spaced from the end portion 22 and the latter is mounted in intimate contact with the inner wall of the cylindrical body 10. Advantageously, the crystal 19 is of a height substantially equal to one-quarter wave-length of the desired operating frequency and the plate 20 has joined thereto, in alignment with the crystal, a backing block or resonator 23 also one-quarter wave-length in height, the crystal 19 and block 23 constituting a one-half wave-length mechanical resonator with a vibrational node at the plate 20.

Because of the shadow effect of the torpedo, the relative response of the two hydrophones of each pair will be dependent upon the diffraction pattern of the torpedo. For compressional waves emanating from a source, such as a submarine, in line with the longitudinal axis of the torpedo, the signal intensities at the two hydrophones in each pair will be equal. However, when the source from which the compressional wave signals emanate is to one side or the other of the longitudinal axis of the torpedo, the signal intensities at the two hydrophones of each pair will be unequal and the difference in intensities will be related to the angular relation of the source to the torpedo. Inasmuch as, as noted heretofore, the hydrophones are substantially non-directional, they are substantially equally sensitive to signals originating either fore or aft of the torpedo and the difference in the response at the hydrophones of each pair is indicative of the location of the signal source with respect to the normal to the axis of alignment of the hydrophones of each pair. The sensitivity of the system is dependent primarily upon the sensitivity of the hydrophones and the difference in signal intensities, as noted heretofore, is dependent upon the diffraction pattern of the torpedo body. In a typical system including hydrophones of the construction illustrated in FIG. 4, the difference noted is of the order of 0.55 decibel per one degree difference in the angle between the signal source and the longitudinal axis of the torpedo so that the hydrophones are responsive to small angles of deviation of the torpedo from the path leading to the signal source, e.g. submarine, and are effective to provide accurate information as to the location of the source with respect to the torpedo. In accordance with one feature of this invention, the aforenoted difference in response is resolved into a control signal related in amplitude and polarity thereto, which control signal is utilized to effect operation of the horizontal or vertical rudder to steer the torpedo toward the source of the compressional wave signals.

Figure 5:
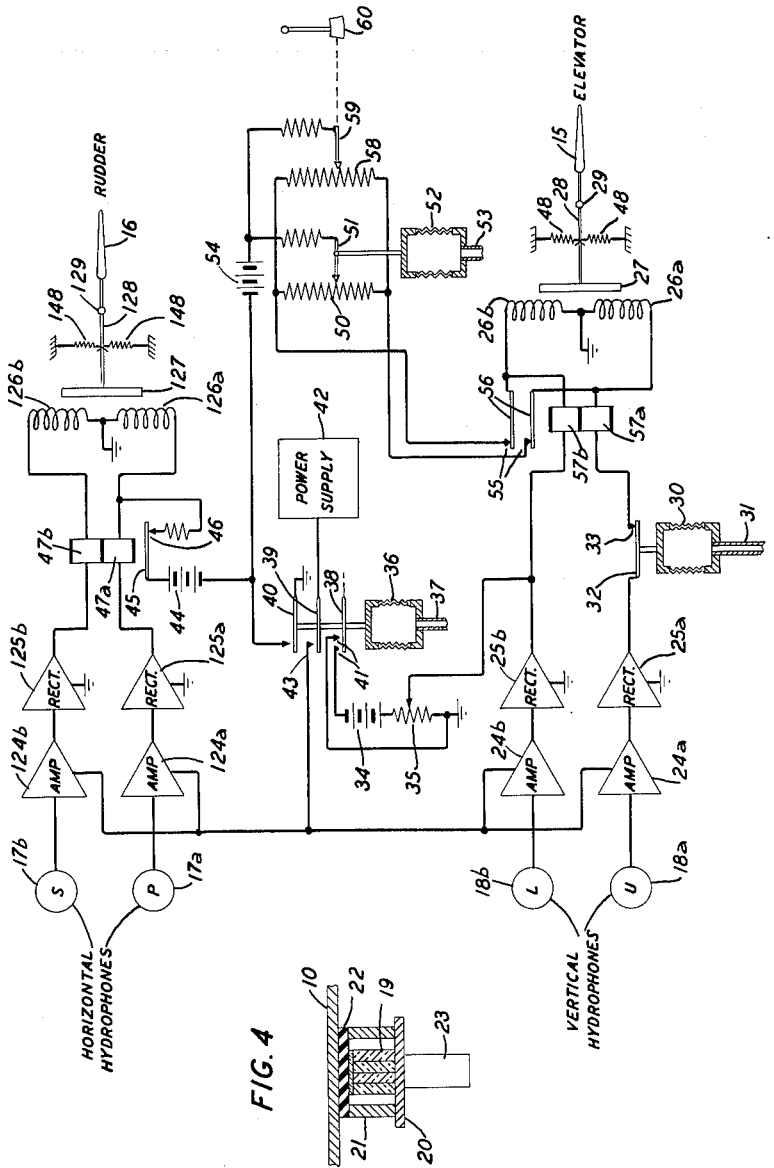
FIG. 5 is a circuit diagram of a steering system illustrative of one embodiment of this invention.

An illustrative system for thus resolving the signals received by the hydrophones is shown in FIG. 5. For ease in reference hereinafter, in this figure the hydrophones 17a and 17b may be considered as mounted on the port and starboard sides of the torpedo respectively and the hydrophones 18a and 18b may be considered as mounted on the top and bottom, respectively of the torpedo. The signals received by the hydrophones 17 are resolved to control the vertical rudder 16; the signals received by the hydrophones 18 are resolved to control the horizontal rudder or elevator 15.

The hydrophones 18a and 18b are connected to substantially matched amplifiers 24a and 24b respectively, advantageously designed to be most efficient at the frequency to which the hydrophones are resonant. The outputs of the amplifiers 24a and 24b are supplied to balanced rectifiers 25a and 25b, respectively, one side of the output circuit of which may be connected to ground as shown. The output circuits of the rectifiers are completed through balanced halves 26a and 26b, respectively, of an operating coil or winding, the mid-point of which is connected to ground as shown. Associated with the coils 26 is an armature 27 which is coupled to the elevator 15 by a suitable connection 28, for example, a connecting rod pivoted at a point such as 29, between the armature and elevator. The armature is deflected in accordance with the amplitude and direction of the resultant of the currents in the two halves 26a and 26b of the operating winding, the currents in these halves being opposite in direction. The resultant current is proportional to the difference in the outputs of the two rectifiers 25a and 25b and this difference in turn is proportional to the difference in the signal intensities at the two hydrophones 18a and 18b. Thus, the elevator 15 will be deflected to steer the torpedo toward that side thereof on which the hydrophone 18a or 18b receiving the greater signal is positioned, the amplitude of the elevator deflection being proportional to the difference in the signal intensities at the two hydrophones.

The armature 27 may be the core of a solenoid of which the windings 26 are the coil. In another construction, the elevator may be deflected by a reversible motor and the coils 26 may be the windings of a differential relay, the direction of energization of the motor and hence the direction of deflection of the elevator being determined by the direction of deflection of the armature 27. A typical relay and motor combination illustrative of such manner of rudder operation is disclosed in the application Serial No. 491,794 filed June 22, 1943, of Hugh K. Dunn.

The hydrophones receive two signal components, one resulting from the compressional waves which reach the hydrophones directly and another due to reflections from the sea surface. There is a possibility, therefore, of false steering of the elevator, particularly where the submarine is at a greater depth of submersion than the torpedo. That is to say, the signal received by the upper hydrophone, considering both components, may be greater than the signals received by the lower hydrophone so that the torpedo would be steered upwardly toward the sea surface instead of downwardly toward the submarine. To prevent such false steering, a ceiling switch may be provided in the output circuit of the rectifier 25a associated with the upper hydrophone 18a and a bias may be provided in circuit with the rectifier 25b and winding 26b associated with the lower hydrophone 18b.

The bias noted may be obtained by way of a potentiometer including a battery 34 and resistance 35, one end of the resistance being grounded as shown, the potentiometer being effective, as is apparent, to produce a biasing current flowing through the winding 26b. This current is set at a predetermined threshold value sufficient to substantially counterbalance the greater component of signals received by the upper hydrophone 18a due to reflections from the sea surface. For example, due to the action of reflected waves the signal level at the upper hydrophone might be of the order of 2 decibels higher than at the lower hydrophone and the biasing current would be made such as to provide of the order of 4 or 5 degrees down rudder.

The ceiling switch comprises a bellows 30 the interior of which is in communication with the sea by way of a pipe 31 terminating in a port in the torpedo body 10 so that the pressure acting on the bellows is proportional to the depth of submersion of the torpedo. The bellows 30 is connected mechanically to an armature 32 having a contact 33 associated therewith. The bellows, armature and contact are so constructed and arranged that when the torpedo is at or below a preassigned depth, for example 30 feet, the armature engages the contact 33 and when the torpedo is at less than this depth, the armature is disengaged from the contact. Thus, if the torpedo should rise above the prescribed level, e.g. 30 feet, due to the effect of reflections from the sea surface or to a signal source such as a surface ship, the ceiling switch operates to open the output circuit of the rectifier 25a and the torpedo dives due to the control action resulting from the signal received by the lower hydrophone 18b and the bias introduced by the depth control mechanism described in the next paragraph.

The horizontal rudder or elevator control circuit includes also a depth control and a trim control, the former being effective to maintain the torpedo traveling at a preassigned depth, for example 45 feet, when the signal intensity at the hydrophones 18 is below a prescribed level, and the latter operating to maintain the torpedo trim. The depth control includes a potentiometer 50, the contact arm 51 of which is mechanically coupled to a bellows 52. The interior of the bellows is in communication with the sea by way of a pipe 53 leading to a port in the body of the torpedo and the bellows is so constructed that when the torpedo is at the preassigned depth the contact arm 51 is at its center position. If the torpedo rises above or sinks below this depth, the contact arm is moved off center accordingly by action of the bellows 52.

The contact arm 51 is connected to a source, such as a battery 54, and the potentiometer resistance 50 is bridged across the windings 26a and the 26b by way of contacts 55 and armatures 56 of a relay, the windings 57a and 57b of which are in circuit with the respective rectifier 25 and winding 26, as shown. When the contact arm 51 is in center position, no unbalance due to the depth control potentiometer exists in the currents traversing the windings 26a and 26b. However, when the contact arm moves off center, an unbalance in these currents is established so that the elevator 15 is deflected in the direction to bring the torpedo to the prescribed level.

The trim control comprises a potentiometer 58 in parallel with the potentiometer 50 and having a contact arm 59 coupled mechanically to a pendulum 60. The pendulum 60 and contact arm 59 are so constructed and arranged that when the torpedo is level the contact arm 59 is in center position and, consequently, no unbalance due to the trim control appears in the currents through the windings 26a and 26b. If, however, the nose of the torpedo tilts upwardly or downwardly, the contact arm 59 moves off center to produce an unbalance in these currents whereby the elevator is deflected in the direction tending to bring the torpedo to a level position.

When the signal intensity at the hydrophones 18 is above a prescribed level, the windings 57a and 57b are energized to cause opening of the depth control and trim control potentiometer circuits so that thenceforth the elevator 15 is controlled in accordance with the signals only that are received by the hydrophones.

Advantageously, the bias control circuit and the power supply circuit for the amplifiers are closed only when the torpedo has sunk to a prescribed depth, for example 15 feet, after it has been launched. This may be effected by an arming switch which may be operated hydrostatically as by a bellows 36 the interior of which is in communication with the sea by way of a pipe 37 leading to a port in the torpedo body 10. The switch comprises three armatures 38, 39 and 40 connected in common, by a push rod 41, to the bellows 36 and actuable in unison thereby. The armature 38 operates to close the circuit of the potentiometer 34, 35, by way of contacts 41 and the armature 39 when operated closes the supply circuit for the amplifiers 24 to the power source 42 by way of the contact 43.

The control circuit for the vertical rudder 16 is generally the same in organization and operation as that for the horizontal rudder or elevator 15, the parts of the vertical rudder circuit corresponding to those of the elevator circuit being designated by the same reference character increased by 100. The vertical rudder circuit, as is apparent from FIG. 5 does not include a ceiling switch or potentiometer bias, depth and trim controls.

It will be noted that after the torpedo has been launched and the signal intensities at the hydrophones are of at least the prescribed levels, whereby the depth and trim potentiometer control circuits are opened, both the elevator 15 and rudder 16 are under continuous control by the hydrophones 18 and 17, respectively, and the direction and amplitude of the rudder and elevator deflection are determined by the polarity and magnitude, respectively, of the signal differential of the respective pair of hydrophones. The effective range of the torpedo, i.e., the maximum distance from the object, e.g., submarine, under attack at which the hydrophones and associated circuits will become effective to steer the torpedo is dependent upon a number of factors. Among the more important of these factors are the intensity of the signals emitted by the object or submarine, the background or ambient water noise and the noises originating at the torpedo itself.

The two halves of each control circuit, each half comprising a hydrophone, amplifier, rectifier and deflecting winding, are substantially balanced. The ambient and self noises picked up by the hydrophones of each pair are of substantially equal intensity so that in the absence of signals received at the hydrophones from the object under attack, the two halves of each control circuit are in balance. The rudder and elevator are deflected in accordance wtih an unbalance in the two halves of the control circuit therefor. Hence, it will be appreciated that each control system is highly sensitive and will cause deflection of the rudder or elevator in response to small differentials in the signal intensities at the two hydrophones of each control circuit even though the signal level, i.e., the level of the signals received from the object under attack, is considerably below, e.g. of the order of 10 to 15 decibels below, that of the ambient and self noises. Thus, it is to be noted that the control circuits constructed in accordance with this invention enable realization of a large effective range for the torpedo.

Furthermore, inasmuch as the rudder and elevator are continuously under control in accordance with the signals emanating from the object under attack, a high degree of accuracy of the steering of the torpedo, a measure of which is the certainty with which the torpedo will strike a target of given size in the first attack, is realized. Of course the torpedo itself must be designed so that large hydrodynamical unbalances cannot occur. The continuous control noted above by way of a control circuit which is normally balanced, prevents large electrical unbalances when the torpedo is under sonic control. Hence and inasmuch as the control system is responsive to small differentials in the signal intensities at the two hydrophones of each pair as pointed out hereinabove, a high degree of accuracy is realized.

In some cases it may be desirable to cause the torpedo to traverse a non-linear course after launching thereof, if at or shortly after the time of launching the signal intensity at the horizontal hydrophones is below a preassigned level. This may be effected by providing a biasing current in the vertical rudder control circuit whereby the torpedo is steered along a circular path when the signal intensity at the hydrophones 17 is below a prescribed level. In one form, such a bias may be obtained from a battery 44 adapted to be connected in circuit with the coil or winding 126a by way of a relay having an armature 45 and a contact 46. The energizing winding of the relay includes two similar coils 47a and 47b in the output circuits of the rectifiers 125a and 125b, the coils being arranged so that the effects thereof upon the armature 46 are cumulative. The biasing circuit including the battery 44 may be under control of the arming switch by way of the armature 40. Normally, the armature 45 is in engagement with the contact 46 and, in the absence of signals of a prescribed intensity at the hydrophones 17, the torpedo follows a circular course. Whenever the signal intensity at the hydrophones 17 is of at least a minimum prescribed intensity, the armature 45 will be moved out of engagement with the contact 46 due to the action of the coils 47 thereon and the rudder 16 is deflected thenceforth in accordance with the relative signal intensities at the two hydrophones 17a and 17b in like manner to the control of the elevator as described hereinabove.

Each of the connecting rods 28 and 128 has associated therewith two balanced opposed springs 48 and 148 respectively which provide a force opposing deflection of the rudders 15 and 16, respectively, proportional to the rudder deflection so that damping of the rudder deflection is obtained.

Although a specific embodiment of this invention has been shown and described, it will be understood that it is but illustrative and that various modifications may be made therein without departing from the scope and spirit of this invention as defined in the appended claims.

What is claimed is:

1. A signal controlled steering system for a moving body comprising a rudder and means for controlling said rudder in accordance with signals emanating from an object to steer the body toward the object, said means comprising a pair of signal translating devices mounted on opposite sides of said body and being substantially non-directional about an axis normal to the longitudinal axis of said body, means for resolving the outputs of said devices into a control signal, and means for deflecting said rudder in accordance with said control signal.

2. A signal controlled steering system for a moving body comprising a rudder and means for controlling said rudder in accordance with signals emanating from an object to steer the body toward the object, said means comprising a pair of substantially identical signal translating devices especially sensitive at a preassigned frequency and spaced a distance great in comparison to the wave-length of said frequency, said devices being mounted in alignment on opposite sides of said body whereby the relative intensities of signals received by the two devices from said object are determined by the diffraction pattern of said body, means for resolving the outputs of said devices in opposition into a direct current control signal, and means for deflecting said rudder in accordance with the polarity of said control signal.

3. A torpedo comprising a body, a rudder, and means for controlling said rudder in accordance with signals emanating from an object to steer the torpedo toward said object, said means comprising a pair of hydrophones mounted in alignment on opposite sides of said body and being substantially non-directional about an axis normal to the longitudinal axis of said torpedo, said body constituting a barrier between said hydrophones whereby the relative intensities of signals received by the hydrophones from said object are determined by the diffraction pattern of the torpedo, means for resolving the outputs of said hydrophones into a control signal and means for deflecting said rudder in accordance with said control signal.

4. A torpedo comprising a cylindrical body, a rudder, and means for controlling said rudder in accordance with signals emanating from an object to steer the torpedo toward the object, said means comprising a pair of hydrophones mounted on opposite sides of said body, diametrically aligned and being substantially non-directional about the axis of alignment thereof, means for resolving the outputs of said hydrophones into a direct current control signal, and means for deflecting said rudder in accordance with the polarity of said control signal.

5. A torpedo comprising a cylindrical body, a rudder, and means for controlling said rudder in accordance with supersonic compressional wave signals of a preassigned frequency emanating from an object to steer the torpedo toward said object, the diameter of said body being large as compared with the wave-length of said frequency, said means comprising a pair of similar hydrophones tuned to said frequency, mounted on opposite sides of said body and aligned along a diameter of said body, said hydrophones being substantially non-directional about the axis of alignment thereof, means for resolving the outputs of said hydrophones into a direct current control signal proportional in amplitude and polarity to the difference in the signal intensities at the two hydrophones, and means for deflecting said rudder in accordance with said control signal.

6. A signal controlled steering system for a moving body comprising a rudder, a pair of similar signal translating devices mounted on opposite sides of said body, means for amplifying and rectifying the outputs of said devices, means for differentially combining said outputs as amplified and rectified, and means operative in accordance with the resultant of the differentially combined signals for deflecting said rudder in the direction corresponding to the polarity of said resultant.

7. A torpedo comprising a body, a rudder, and means for controlling said rudder in accordance with signals emanating from an object to steer the torpedo toward said object, said means comprising a pair of hydrophones mounted on opposite sides of said body, means for amplifying and rectifying the outputs of said hydrophones, means for resolving said outputs as amplified and rectified into a control signal related in ampiltude and polarity to the difference of said outputs, and means for deflecting said rudder in accordance with said control signal.

8. A torpedo compising a body, a rudder, means for deflecting said rudder in oppoiste directions, a pair of hydrophones mounted on opposite sides of said body, a control circuit including said hydrophones, means for resolving the outputs thereof differentially into a direct current control signal for actuating said deflecting means to deflect said rudder in the direction corresponding to the polarity of said control signal, means for impressing a direct current potential upon said circuit effective to cause deflection of said rudder by said deflecting means in one direction whereby the torpedo is steered along a circular course, and means for disabling said potential impressing means when the outputs of said hydrophones are of a prescribed intensity.

9. A torpedo comprising a body, a rudder arranged to steer the torpedo vertically, means for controlling said rudder in accordance with submarine signals emanating from an object to steer the torpedo toward said object, said means comprising a pair of hydrophones mounted on the top and bottom of said body, means for resolving the outputs of said hydrophones into a control signal proportional to the difference in signal intensities at said hydrophones, and means for compensating for differences in said signal intensities due to signals reflected from the sea surface.

10. A torpedo comprising a body, a rudder arranged to steer the torpedo vertically, means for controlling said rudder in accordance with signals emanating from a submerged source to steer the torpedo toward said source, said means comprising a pair of hydrophones mounted on the top and bottom of said body, circuit means for resolving the signals received by said hydrophones into a control signal, means for deflecting said rudder in accordance with said control signal, and means for compensating for signals received by said hydrophones due to reflections at the sea surface.

11. A torpedo comprising a body, a rudder arranged to steer the torpedo vertically, means for controlling said rudder in accordance with signals emanating from a submerged source to steer the torpedo toward said source, said means comprising signal translating means, means for resolving the output of said translating means into a control signal, means for deflecting said rudder in accordance with said control signal, and means for compensating for reflections of the signals emanating from said source and received at said translating means.

12. A torpedo comprising a body, a vertical rudder, an elevator, a first pair of hydrophones mounted on opposite sides of said body, a second pair of hydrophones mounted on the top and bottom of said body, means for resolving the output of said first pair of hydrophones into a control signal, means for deflecting said rudder in accordance with said control signal, means for resolving the output of said second pair of hydrophones into a second control signal, means for deflecting said elevator in accordance with said second control signal, bias means associated with said first resolving means for causing operation of said deflecting means to steer the torpedo along a curved course when the output of said first pair of hydrophones is below a prescribed level, means for disabling said bias means when said output of said first pair of hydrophones is of at least said level, and means associated with said second resolving means for compensating for differences in the signal intensities at the hydrophones of said second pair due to signals reflected from the sea surface.

13. A signal controlled steering system for a moving body comprising a rudder, means for deflecting said rudder in opposite directions, a pair of signal translating devices, means for controlling said deflecting means continuously in accordance with the difference in the signal intensities at the two translating devices, said controlling means comprising a circuit having two normally balanced halves each of which includes one of said translating devices, means for amplifying and rectifying the output of the respective translating device, and an element for converting the amplified and rectified output into a force effective on said deflecting means.

14. A torpedo comprising a body, a rudder, means for deflecting said rudder, a pair of substantially identical hydrophones mounted in alignment on opposite sides of said body, and means for controlling said deflecting means continuously in accordance with the polarity and magnitude of the difference of the outputs of said hydrophones whenever the outputs of said hydrophones are of at least a prescribed level.

No references cited.

SAMUEL FEINBERG, *Primary Examiner.*

FRED C. MATTERN, Jr., BURNHAM YUNG KWAI,
*Examiners.*